United States Patent Office 2,760,298
Patented Aug. 28, 1956

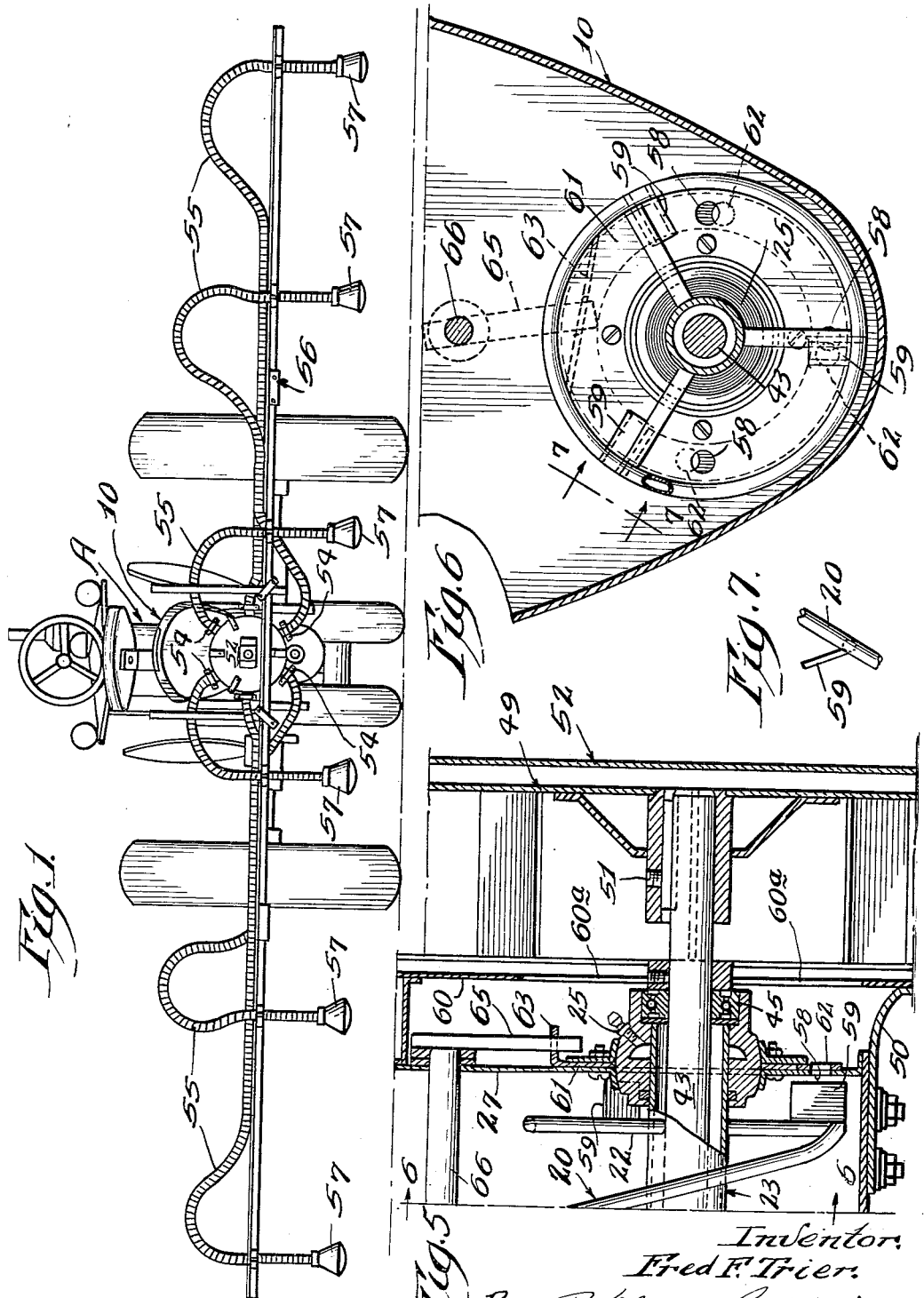

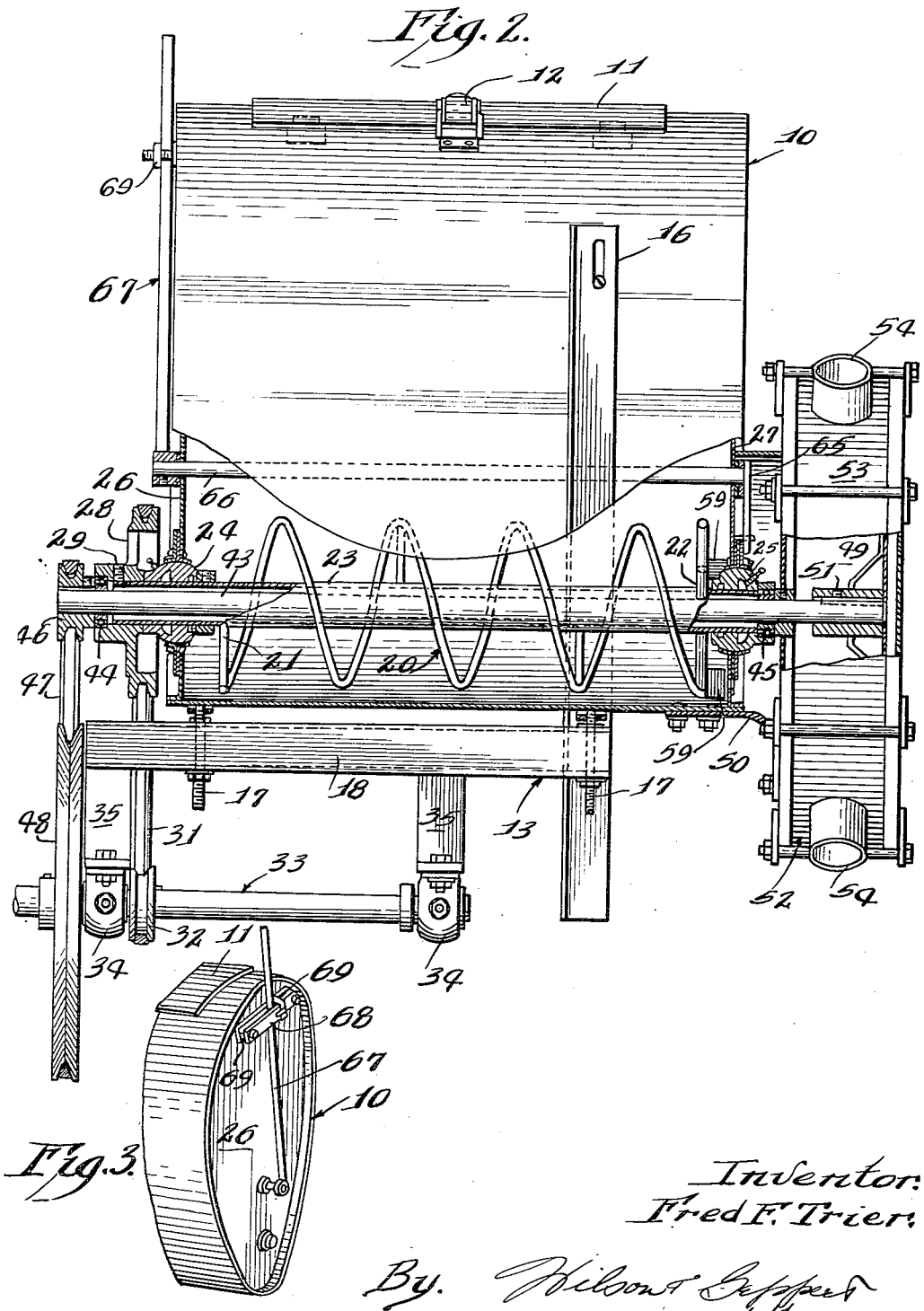

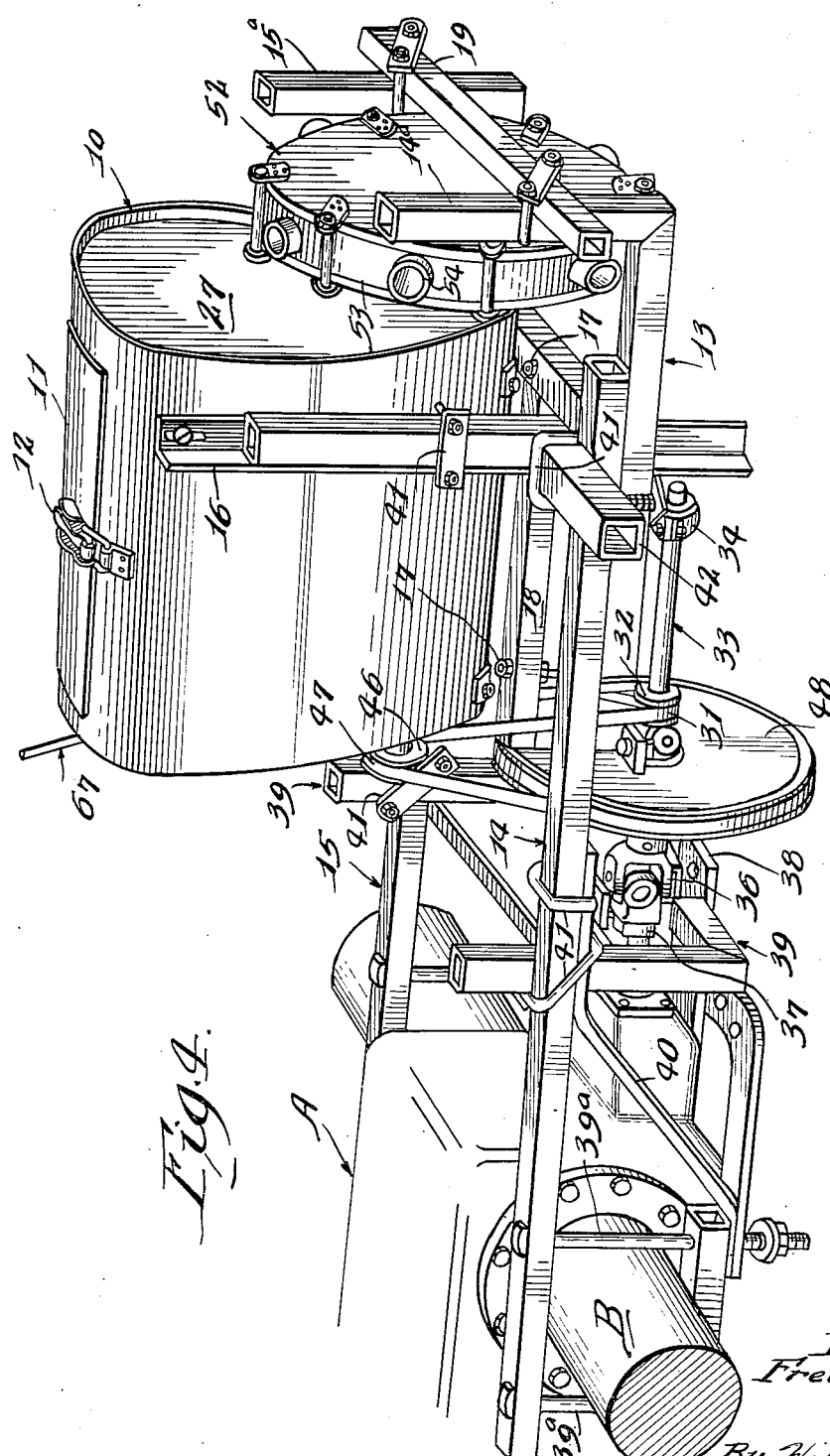

2,760,298
POWER-OPERATED DUSTER

Fred F. Trier, Oshkosh, Wis., assignor to H. D. Hudson Manufacturing Company, Chicago, Ill., a corporation of Minnesota Application February 24, 1953, Serial No. 338,248

8 Claims. (Cl. 43—148)

The present invention relates to a power-operated duster of the type adapted to be driven from a suitable power take-off from a tractor or other source of power.

Among the objects of the present invention is the provision of a novel hopper or receptacle for an insecticide dust or other dry powder. This hopper or receptacle is so contoured, designed and constructed as to most effectively supply the dust or powder without clogging or dust bridging. By forming this hopper with downwardly and inwardly converging opposite sides merging into a rounded bottom, danger of clogging or bridging of the contents is elimnated and continuous free flow is assured.

A further object of the present invention is the provision of novel means for transferring the dust or dry powder from the hopper to the blower housing, whereby to obtain optimum uniform distribution of the dust or dry powder to each outlet of the blower housing.

Another important object of the present invention is the provision of a novel fan housing having substantially radially projecting outlets through which blasts of dust mixed with air are ejected at high velocity, such outlet arrangement assuring most effective and uniform distribution of the dust over wide areas.

A further important object is the provision of a novel and simplified form of drive assembly in which the drive mechanism for the low speed agitator and the drive mechanism for the high speed fan or blower are combined into a simple and campact assembly.

The present invention further comprehends the provision of a novel means and manner of tightening or adjusting the belts for driving the shaft for operating the spiral agitator and the shaft for operating the fan or blower by raising and lowering the hopper and associated parts.

Another and highly important object of the present invention is the provision of a novel system or arrangement for mounting the power duster to a power take-off of a tractor or other power source whereby to afford greater adjustment for the mounting arrangement and compensating for the differences in location of the power take-off of various tractors in relation to their axles.

By the present mounting arrangement, there is eliminated the need of a special mounting assembly for each particular model of tractor or power source as the present invention comprehends a mounting arrangement or assembly that is adaptable to a relatively large number of such tractor models or sources of power for operating the duster.

A further object of the present invention is to provide a positive, yet flexible, connection in the form of a universal joint between the power take-off and the drive shaft of the duster. By reason of this connection, the need for means or mechanism to provide constant belt tension on the drive belt of prior types of dusters to compensate for the movement of their drive shafts in relation to the power take-off shaft due to springing of the mount is eliminated.

Further objects are to provide a construction of maximum simplicity, efficiency, economy and ease of assembly and operation, and such further objects, advantages and capabilities as will later more fully appear and are inherently possessed thereby.

In the drawings:

Figure 1 is a view in rear elevation of the novel power-operated duster unit including its boom and flexible discharge tubes all mounted upon and operated from a tractor or other power source.

Fig. 2 is a view in side elevation of the power-operated duster, with parts broken away to disclose the details of the spiral agitator, the fan or blower and their shaft assemblies.

Fig. 3 is a fragmentary perspective view of the forward end of the dust hopper or receptacle, the view being on a reduced scale from that shown in Fig. 2.

Fig. 4 is a perspective view of the novel power-operated duster and showing the manner of mounting it upon a tractor or power source.

Fig. 5 is an enlarged fragmentary view in vertical cross section through the rear or discharge end of the hopper and fan assembly.

Fig. 6 is a view in vertical cross section taken in a plane represented by the line 6—6 of Fig. 5 and viewed in the direction of the arrows.

Fig. 7 is a fragmentary end view of one of the tilted agitator fins, the view being taken on approximately the line 7—7 of Fig. 6.

Referring to the disclosure in the drawings and more particularly to the embodiment selected to illustrate the present invention, the present novel power-operated duster comprises a hopper or receptacle 10 having a large access opening in the top thereof for receiving the insecticide dust or the like to be disseminated and a closure 11 for this opening. A cover lock 12 is provided for retaining this closure latched. The hopper is rigidly mounted upon a frame 13 including side tube assemblies 14 and 15 at the opposite sides of the hopper, an upright angle iron guide 16 adjustably affixed to each of the opposite sides of the hopper, and adjustment bolts 17 spaced longitudinally of the hopper and projecting through a horizontal tubular member 18 of the frame (Figs. 2 and 4). At the rear, these side tube assemblies include spaced uprights 14a and 15a and a transverse tubular member or brace 19 clamped thereto by U-bolts and bars.

By providing the hopper with the opposite sides converging inwardly throughout the greater portion of their length to merge into the reduced but rounded lower end portion, clogging or bridging of the dust in the interior of the hopper is reduced to a minimum.

Mounted within the lower reduced end of the hopper 10 (Fig. 2) is a spiral agitator 20 having its opposite ends 21 and 22 welded or otherwise rigidly affixed to and rotatable with a hollow shaft 23. This hollow shaft extends through and is rotatable in self-aligning bearings 24 and 25 mounted in the opposite end walls 26 and 27 of the hopper 10, and is driven by means of a V pulley 28 attached to the forward end of the agitator shaft 23 by means of a set screw 29, through a V belt 31 and a substantially smaller V pulley 32 pinned or keyed to a drive shaft 33.

The drive shaft 33 rotates in a pair of spaced self-aligning bearings 34 supported by depending brackets 35 carried by the member 18 of the supporting frame 13 and is connected through a universal joint 36 (Fig. 4) to a power take-off shaft 37 powered from a tractor A or other power source. As shown in Fig. 4, on the draw bar 38 of the tractor rest the inturned ends of oppositely disposed grace members 39, with the side tube assemblies 14 and 15 bolted at 39a to the axle B of the tractor A or other power source and braced by brace members 40, the latter being joined to the side tubes 14 and 15 and the brace members 39 by U-bolt bars 41 thereby forming a rigid frame assembly in which the duster assembly is supported at the rear by a suitable brace member or bracket 42 at each side of the hopper 10 and cradled against the angle iron guides 16 (one at each side of the hopper) and also resting upon and are clamped to the side tube assemblies 14 and 15 by U-bolt bars 41. The brace members or brackets 42 can be adjusted vertically to compensate for the difference in location on various tractors or power sources of the power take-off shaft 37 in relation to the tops of the side tube assemblies 14 and 15, and also adjusted horizontally to compensate for the difference in location of the power takeoff shaft 37 in relation to the center of the axle B.

The agitator shaft 23 by reason of the size of the pulleys 28 and 32, operates at a reduced speed of approximately one-fourth the speed of rotation of the drive shaft 33 which is connected by direct drive to the power take-off shaft 37. A fan shaft 43 passes through and is concentric with the hollow agitator shaft 23 with its opposite ends journalled or rotated in a ball bearing 44 pressed into the hub of the agitator pulley 28, and a ball bearing 45 pressed into the self-aligning bearing 25.

At the extreme forward end of the fan shaft 43 is pinned or keyed a relatively small V pulley 46 driven by a V belt 47 from a large V drive pulley 48 pinned on keyed to the drive shaft 33. By reason of the substantial difference in diameter of the pulleys 46 and 48, this fan shaft 43 is rotated at a high rate of speed approximately seven times the speed of the drive shaft 33. To the fan shaft 43 at its rear end is affixed or splined a fan 49 held in anchored position on the shaft by means of a set screw 51 and provided with radially projecting vanes or blades. The fan is rotatable at high speed in a blower housing 52 rigidly bolted or otherwise affixed, as by one or more brackets 50, to the rear end of the hopper 10 and is provided in its peripheral wall 53 with a plurality of spaced and substantially radially projecting outlets 54. This arrangement of the outlets is important in giving better and more uniform distribution of the dust. The rear wall 60 of the blower housing 52 is provided with ports 60ª open to the atmosphere from between the end wall 27 of the hopper 10 and the spaced rear wall 60 of the blower housing, it being understood that the space between the hopper 10 and the blower housing is open to the atmosphere.

As shown in Fig. 1, to each outlet 54 may be affixed a flexible tube 55, carried on a spray boom 56 assembly, each tube having a discharge nozzle 57 for supplying the dust in a desired pattern and over a wide area.

To adjust or tighten the belts 31 and 47, the adjusting screws 17 may be raised or lowered which in turn raises and lowers the entire assembly of the hopper 10, fan or blower housing 52 and associated parts.

In the end or rear wall 27 of the hopper 10 is provided a plurality of uniformly spaced openings or apertures 58 (Figs. 2, 5 and 6), spaced about the bearing 25, for the discharge of the dust from the lower portion of the hopper by means of multiple agitator fins or blades 59 carried by the rear end 22 of the spiral agitator 20. The effective size of these openings or apertures may be adjusted by a regulator assembly comprising an annular, rotatable plate 61 encompassing the bearing 25 and having openings or apertures 62 similarly arranged with respect to the openings 58, the openings 62 of the plate 61 being adapted to be moved into full or partial registry or alignment with the openings or apertures 58, or the plate 61 may be moved to completely close these openings 58.

Movement of the plate is accomplished by means of a slotted projection 63 on the plate 61 engaged by an arm 65 attached to a rocking shaft 66 projecting through the hopper 10 and provided at its forward end where it projects through the end plate 26, with a rocking arm or bar 67. The upper end of this arm or bar 67 (Fig. 3) is adapted to be moved and guided within the spaced plates of a bracket 68 and limited in its rocking or tilting movement by spaced bolts or projections 69.

Dust to be disseminated or dispensed is poured into the hopper 10 through the access or filling opening upon release of the latch 12 and opening of the pivoted or hinged closure 11. With dust in the hopper and the drive shaft 33 rotated, the outer shaft or tube 23 drives the spiral agitator 20 at low speed and the inner shaft 43 rotates the fan or blower 49 at relatively high speed. The spiral agitator or worm 20 keeps the dust in agitation and at the same time forces this dust to the rear of the hopper 10 where it is forced out through the openings 58 and through the aligned open or partially open apertures 62 in the adjustable plate 61, by means of the blades on the rear end 22 of the agitator 20 and the section of the fan 49. With the openings 62 in the plate 61 fully or partially open, the amount of dust entering the fan or blower housing 52 is thus accurately metered by the suction created by the fan. The dust mixed with air from the atmosphere enters the ports 60ª of the fan chamber from between the receptacle 10 and the fan housing 52 is then forced outwardly through the discharge ports or outlets 54 and connected flexible tubes 55, and is directed through the nozzles 57 onto the plants or vegetation to be dusted.

Having thus disclosed the invention, I claim:

1. In a power-operated duster, a hopper for the dust, an agitator in the base of the hopper for breaking up and conveying the dust in the hopper toward the discharge end thereof, a fan housing affixed to the discharge end of the hopper, a fan in said housing, a pair of concentric shafts disposed in the base of the hopper with the agitator attached to and driven by the outer shaft and the inner shaft attached to and driving the fan, and a common drive means for rotating said shafts at different speeds of operation.

2. In a power-operated duster, a hopper for the dust, an agitator in the base of the hopper for breaking up and conveying the dust in the hopper toward the discharge end thereof, a fan housing affixed to the discharge end of the hopper for receiving the dust from the discharge end of the hopper, a fan in said housing for discharging the dust mixed with air from the housing, a pair of concentric shafts in the base of the hopper one of which is connected to and drives the agitator and the other connected to and drives the fan, radial discharge outlets in the fan housing for directing and conveying the mixture discharged by the fan, a power take-off connected to a suitable power source and a common drive assembly including means for operating said shafts at different speeds.

3. In a power-operated duster, a hopper for the dust to be disseminated, an agitator in the base of the hopper for moving the dust to the discharge end of the hopper, a blower housing and fan therein adjacent the discharge end of the hopper and receiving dust transferred thereto by the agitator and drawn into the blower housing by the fan, spaced outlets in the housing for discharging the dust exterior of the housing, and a common drive assembly including concentric shafts one of which rotates the agitator at a relatively low speed and the other rotates the fan at a relatively high speed.

4. In a power-operated duster, a hopper for the dust, an agitator in the base of the hopper for conveying dust to the discharge end of the hopper, a fan housing and fan therein located adjacent the discharge end of the hopper, a hollow shaft for rotating the agitator, a shaft rotatable within the hollow agitator shaft for rotating the fan at a substantially higher speed, a power take-off for driving both shafts, a drive shaft, a pair of pulleys connected to the power take-off, a pulley connected to each of the shafts, a belt connecting each pulley on the power take-off to a shaft with the pulleys being of such size as to drive the agitator and fan shafts at different speeds, a supporting frame on which said assembled hopper, housing and fan are adjustably mounted, and adjusting means for adjusting the position of the assembled hopper and blower housing whereby to adjust the position of the agitator and fan shafts and adjust the tension on the belts.

5. In a power-operated duster, a hopper for the dust, an agitator in the base of the hopper for conveying dust to the discharge end of the hopper, a fan housing and fan therein located adjacent the discharge end of the hopper and supported thereon, concentric shafts journalled in and carried by the hopper, one of said shafts rotating the agitator and the other projecting into the blower housing for rotating the fan, a supporting frame for the assembled hopper, fan housing and fan, means for adjustably mounting the assembled hopper, fan housing and fan on the frame, a power take-off and drive shaft carried by the frame, pulleys on the drive shaft, a pulley on the agitator shaft and a pulley on the fan shaft, drive belts connecting a pulley on the drive shaft to the pulley on the agitator shaft and the other pulley on the drive shaft to the pulley on the fan shaft, and means for adjusting the tension on the belts by raising and lowering the assembled hopper, fan housing and fan relative to the frame.

6. In a power-operated duster, a hopper having spaced end walls and downwardly and inwardly converging side walls constituting a rounded bottom portion thereof, one end wall having openings therein, a shaft and an agitator both extending longitudinally of and rotatable about a common horizontal axis in said rounded bottom, said agitator being adapted to agitate said dust and feed the same toward said one end wall having openings therein, said agitator comprising a member having convolutions constituting a spiral carried by said shaft with its convolutions disposed in spaced relation to said shaft, a fan housing and a fan with said housing having openings disposed therein, said fan housing being disposed adjacent to but spaced from said one end wall having openings with the said openings in said fan housing being in operative communication with the said openings in said end wall, whereby dust from said hopper may flow from said hopper into said fan housing and air may enter said openings in said fan housing through said space therebetween.

7. In a power-operated duster, a hopper having spaced, vertically arranged end walls with one of said end walls having openings therein, and downwardly and inwardly converging side walls constituting a longitudinally extending rounded bottom portion of said hopper, a shaft and a spiral agitator carried thereby and comprising a spiral member mounted at its ends upon the shaft but with its convolutions held spaced from said shaft, said shaft and agitator being mounted in and extending longitudinally of the bottom of the hopper for agitating and conveying the dust to one end wall of the hopper, blades on the end of the agitator adjacent the last mentioned end wall for discharging the dust from the hopper through said end wall having openings therein, a blower housing and fan mounted adjacent to but spaced from said last mentioned end wall of the hopper for receiving the dust, said blower housing having openings therein adapted to register with the openings in said end wall having openings therein, and means for admitting air into said blower housing whereby the air and dust are adapted to be introduced into said blower housing.

8. In a power-operated duster, a hopper for receiving the dust to be dispensed having spaced end walls, means in the hopper for agitating and conveying the dust toward one end wall of the hopper, a blower housing and fan mounted adjacent to but spaced from said last mentioned end wall of the hopper, said last mentioned end wall of the hopper adjacent the blower housing having discharge ports for the discharge of dust from the hopper, said blower housing having inlet ports open to the atmosphere and in alignment with the discharge ports in said end wall for the entrance of dust from the hopper and for the entrance of air, and the periphery of the blower housing having discharge ports through which the fan discharges the dust mixed with air drawn into said blower housing.

References Cited in the file of this patent

UNITED STATES PATENTS

| | | |
|---|---|---|
| 552,000 | Randall et al. | Dec. 24, 1895 |
| 714,802 | Kiser | Dec. 2, 1902 |
| 967,266 | Thomas | Aug. 16, 1910 |
| 990,762 | McKnight | Apr. 25, 1911 |
| 1,316,514 | Sieverkropp | Sept. 16, 1919 |
| 1,423,125 | Lemons | July 18, 1922 |
| 1,476,889 | Hobbs et al. | Dec. 11, 1923 |
| 1,619,316 | Root | Mar. 1, 1927 |
| 1,666,350 | Pitt | Apr. 17, 1928 |
| 1,674,048 | Lang | June 19, 1928 |
| 1,686,317 | Feeny | Oct. 2, 1928 |
| 1,750,147 | Wright | Mar. 11, 1930 |
| 2,157,630 | Root | May 9, 1939 |
| 2,282,828 | Root | May 12, 1942 |
| 2,425,419 | Carnes | Aug. 12, 1947 |
| 2,554,432 | Walters | May 22, 1951 |